Sept. 10, 1940.    E. C. BRISBANE ET AL    2,214,119
VALVE CONTROL MECHANISM
Filed Aug. 6, 1938    4 Sheets-Sheet 4

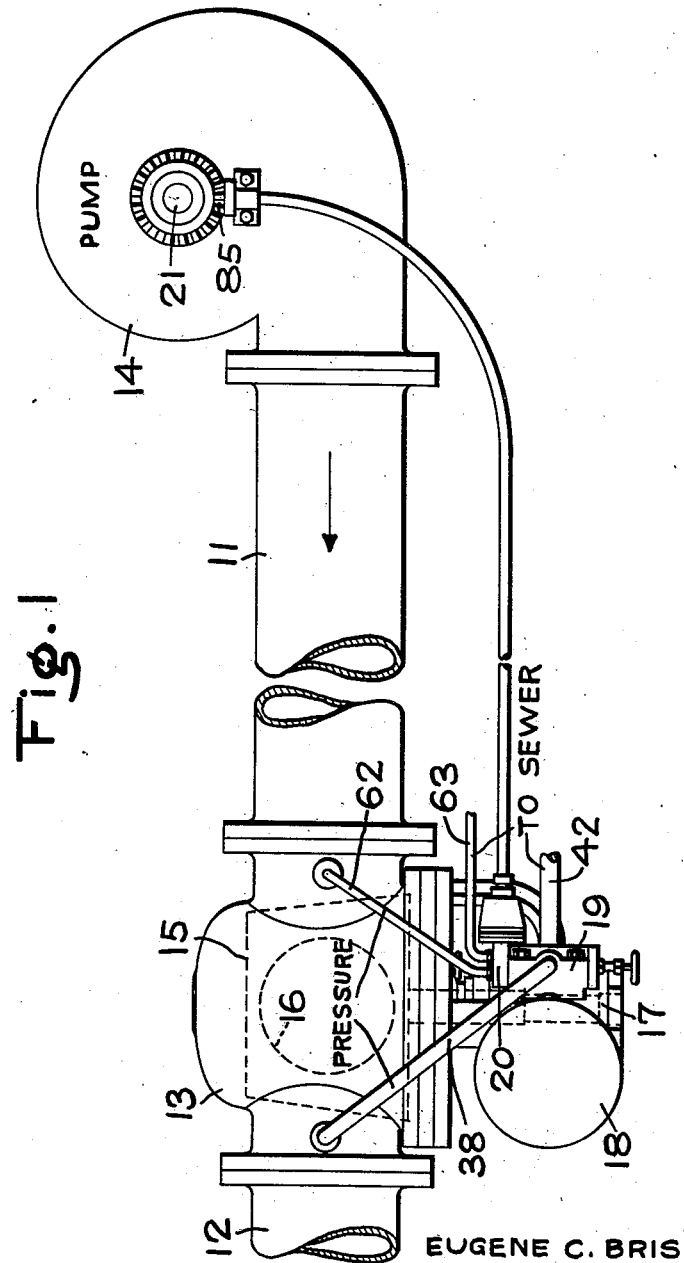

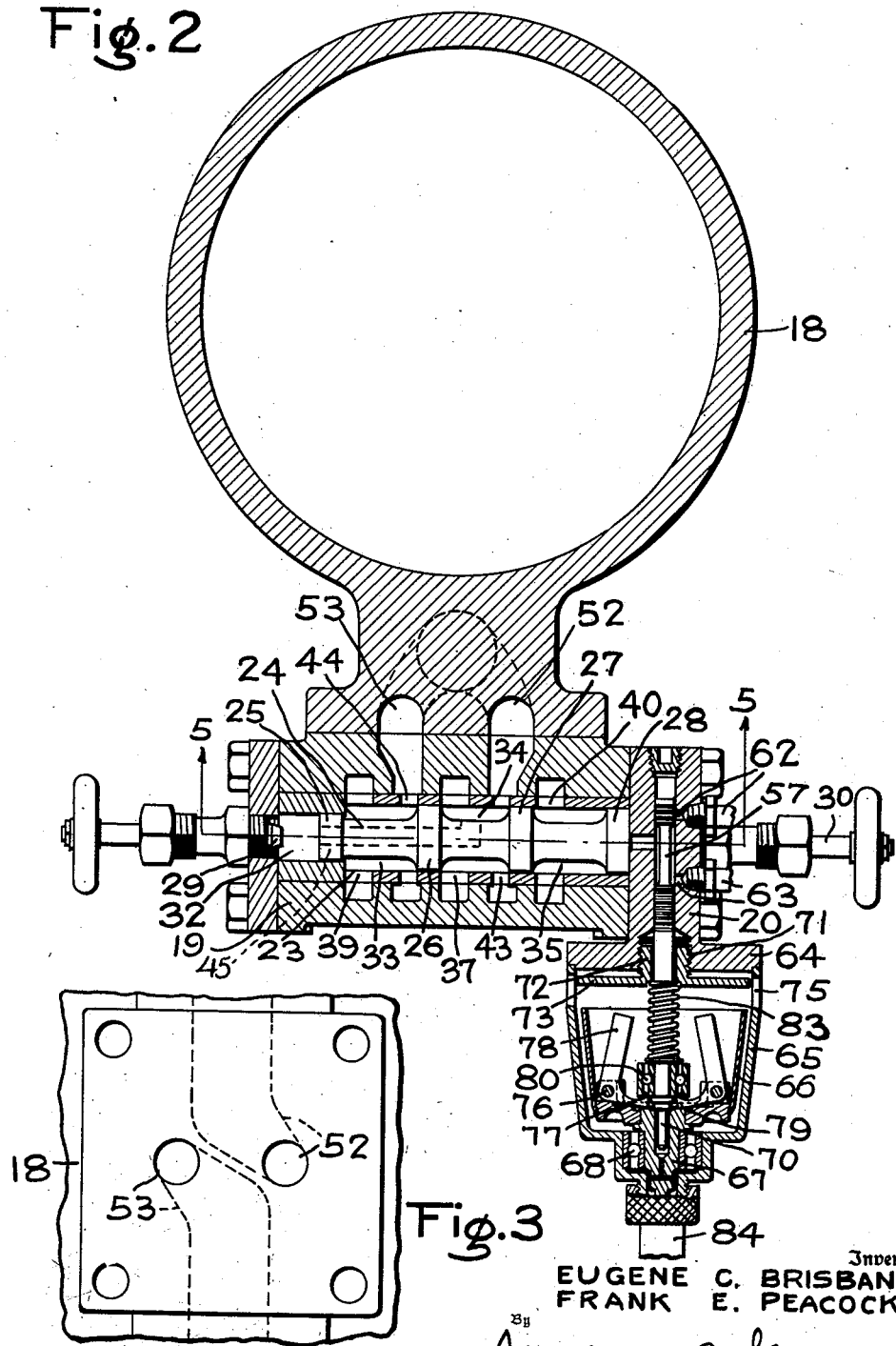

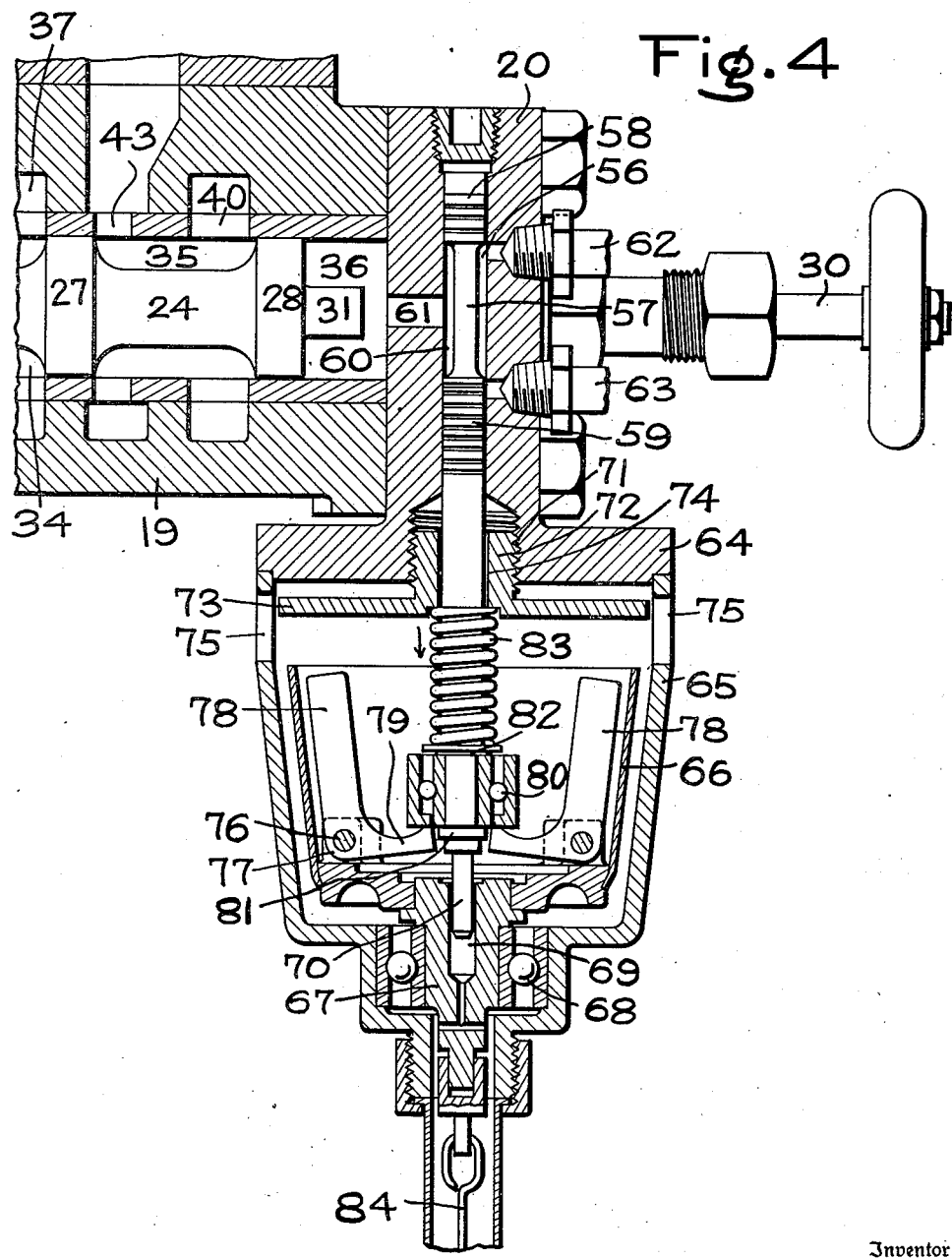

Inventors
EUGENE C. BRISBANE
FRANK E. PEACOCK
By Malcolm F. Gannott
Attorney

Patented Sept. 10, 1940

2,214,119

UNITED STATES PATENT OFFICE 2,214,119

VALVE CONTROL MECHANISM

Eugene C. Brisbane and Frank E. Peacock, York, Pa., assignors to S. Morgan Smith Company, York, Pa., a corporation of Pennsylvania Application August 6, 1938, Serial No. 223,378

5 Claims. (Cl. 103—40)

This invention relates to automatic control mechanism of the type employed with power operated valves installed in fluid conduits, pipe lines, etc., wherein the pressure and flow conditions are created by a pump or the like.

A suitable application of the invention is in the control of a power operated check valve in a pipe line supplied from a centrifugal pump.

In such an installation it is desirable to open the valve when the pump has come up to speed and is prepared to deliver fluid through the pipe line, said valve being adapted to remain open during the operation of the pump and then be closed when the pump for any reason stops or loses its prime, to thereby prevent any back flow through the pump.

Furthermore, it is important especially in avoiding water hammer in the use of such check valves that the mechanism should operate to close the valve before any objectionable back flow occurs. In other words, the closing movement of the valve is adapted to be inaugurated as soon as the speed of the pump drops below normal speed and before any objectionable back flow can take place.

The invention also contemplates the provision of suitable control mechanism for the valve, which mechanism is operatively connected with the pump shaft in such a manner that the valve is controlled directly by the operation of the pump and not by any flow conditions in the pipe line.

With the foregoing and other objects and advantages in view, the invention consists in the preferred construction and arrangement of the several parts which will be hereinafter fully described and claimed.

In the accompanying drawings:

Figure 1 is a diagrammatic view of a valve control mechanism embodying the present invention;

Fig. 2 is a horizontal section through the power cylinder and control valves therefor of the valve operating mechanism shown in Fig. 1, the parts being shown in valve closed position when the pump is idle;

Fig. 3 is an elevation of the portion of the power cylinder to which the control valve is attached, the control valve being removed to show the ports through which the operating fluid is supplied to the power cylinder;

Fig. 4 is an enlarged horizontal section of a portion of the structure shown in Fig. 2, the parts being shown in valve open position.

Figure 5:
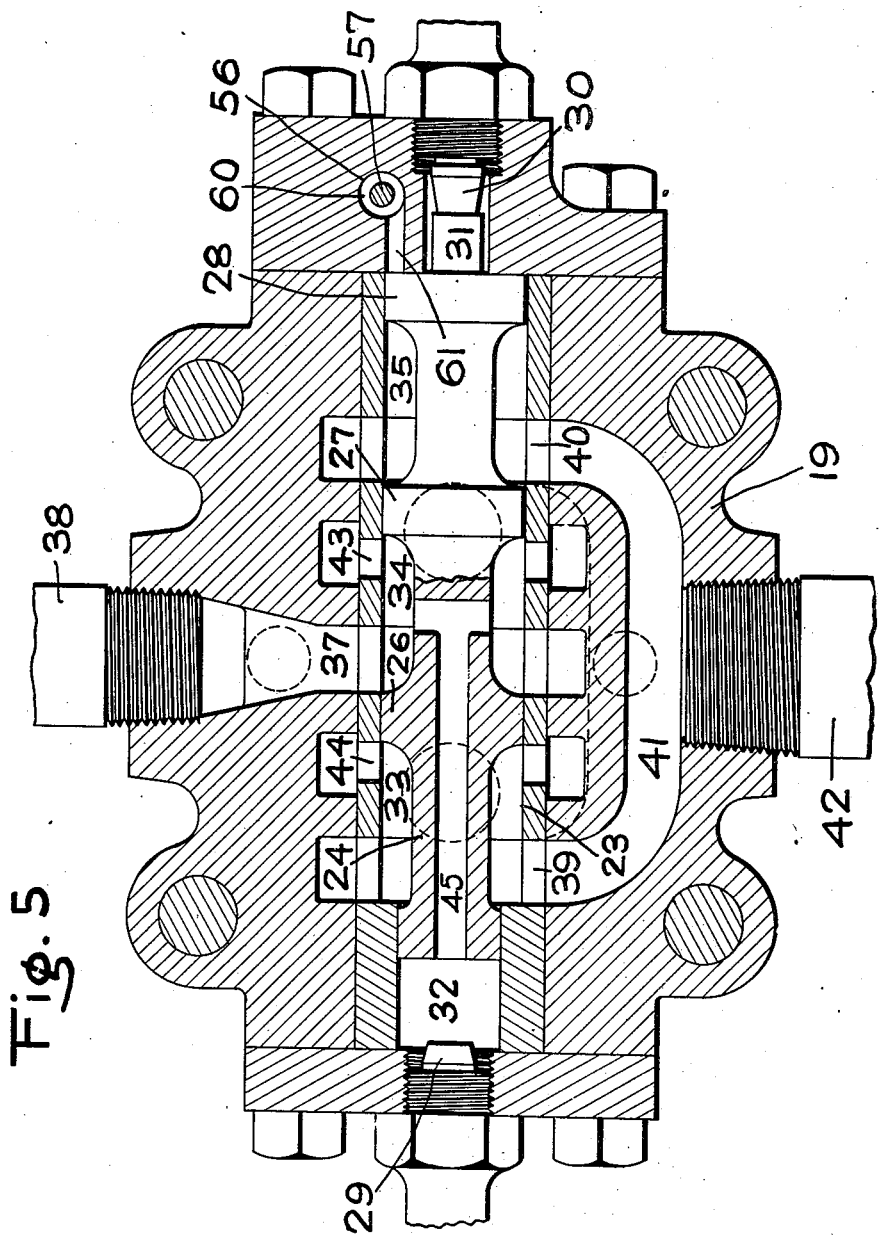
Fig. 5 is a vertical longitudinal section of the control valve taken on the line 5—5 of Fig. 2.

Referring to the drawings, and especially to Fig. 1, the main pipe line consists of two sections 11 and 12 which pipe sections are connected to the opposite sides of a valve 13, section 11 being a supply pipe, and section 12 being the main pipe.

Pipe 11 may lead from a suitable source of supply, and the pressure of the fluid in said pipe is supplied by a pump 14.

The valve 13 may be of any type of valve having automatically operated actuating mechanism. The valve 13 may be the improved tapered plug valve shown and described in United States patent application Serial No. 203,568, filed April 22, 1938, by Eugene C. Brisbane and Eugene H. Myers, for Valve mechanism, now Patent No. 2,197,202, dated April 16, 1940.

The valve 13 has a rotatable plug 15 with a waterway 16 formed therein. The plug 15 is adapted to be rotated by suitable mechanism indicated generally at 17, Fig. 1, which mechanism is operated by the piston of a hydraulic cylinder 18. Said cylinder is adapted to be supplied with fluid under pressure under the control of a control valve 19, (see Figs. 2 and 5). The control valve 19 in turn is under the control of a pilot valve device 20 which is operatively connected to the shaft 21 of the pump 14 in the manner to be hereinafter described.

As shown in Figs. 2 and 5, the control valve device 19 comprises a casing formed with a cylindrical bore 23, in which is mounted a plunger 24 formed with spaced heads 25, 26, 27 and 28.

The movement of the plunger 24 in one direction is limited by an adjustable stop 29 which is adapted to engage the end of the plunger having the head 25, and the movement of the plunger in the opposite direction is limited by an adjustable stop 30 which is adapted to engage an extension 31 on the end of the plunger 24 having the head 28.

The portion of the bore 23 in which the plunger head 25 is disposed is of less diameter than the diameter of the remainder of said bore.

The plunger heads divide the bore 23 into a plurality of chambers 32, 33, 34, 35 and 36 (see Figs. 4 and 5).

Chamber 34 is connected to a source of fluid under pressure by a port and passage 37 and a pipe 38.

As shown in Fig. 1, pipe 38 may be connected to the conduit on the downstream side of the valve 13.

Chambers 33 and 35 are connected to a free discharge or sewer, by ports 39 and 40, respectively, passage 41, and pipe 42.

The cylinder 18 has two passages 52 and 53, respectively, which lead to the opposite ends of said cylinder in the manner shown and described in the above referred to Brisbane and Myers valve application, so as to supply operating fluid to the piston (not shown) in said cylinder for the purpose of operating the same.

As shown in Figs. 2 and 3, passage 52 is connected to valve chamber 34 by a port 43, and passage 53 is connected to chamber 33, by a port 44.

Fluid under pressure is adapted to be supplied by pipe 38 and passage and port 37 to chamber 34 so that said chamber is always supplied with fluid under pressure.

Chamber 32 is also adapted to be supplied with fluid under pressure at all times by passage and port 45 which connects chambers 32 and 34.

When the valve 13 is closed the plunger 24 is in the position shown in Fig. 5, in which position port 43 is connected to port 37 so that fluid under pressure will be supplied to the upper side of the piston in cylinder 18 from the pipe 38. The opposite side of the piston in cylinder 18 will be connected to the sewer 42 through passage 53, port 44, chamber 33, port 39, and passage 41.

As shown in Figs. 2 and 4, the pilot valve device 20 comprises a casing formed with a bore 56, in which is slidably mounted a valve element 57 having two spaced heads 58 and 59.

Chamber 60 in the bore 56 between the valve heads 58 and 59 is connected to chamber 36 heretofore referred to by a passage or port 61.

Fluid under pressure is adapted to be supplied to chamber 60 by a port and pipe 62 connected to the pipe line on the pump side of the valve 13, as shown in Fig. 1.

The chamber 60 is also connected to a free discharge or sewer by a port and pipe 63.

As shown in Fig. 2 when the pump 14 is idle or not operating, valve head 58 laps port 62 thereby cutting off the communication by which fluid under pressure is supplied to chamber 60, and since port 63 is uncovered by the valve head 59, fluid in chamber 60 will be exhausted to the sewer through the pipe 63.

The casing of the valve device 20 may be bolted or otherwise secured to an end of the control valve 19, and the casing of the valve device 20 is formed with an extension 64, to which is secured a housing 65 for the operating mechanism of the valve element 57 (see Figs. 2 and 4).

Within the housing 65 is a cup-shaped rotator 66 having a shaft 67 at one end rotatably mounted in a ball bearing 68 carried by the housing 65.

The shaft 67 is concentrically disposed on the longitudinal center line of the valve element 57, said shaft having a bore 69 formed centrally therein for the reception of the reduced end portion 70 of said valve element 57.

The portion 64 of the casing of the valve device 20 is formed with a central threaded bore 71, said bore 71 having a diameter somewhat larger than the diameter of the valve element 57.

A nut 72 having a threaded portion mounted in the bore 71 and a flange 73 surrounds the valve element 57, said nut 72 having a central opening 74 formed therethrough for the valve element 57. The construction is such that the opening 74 is made slightly larger in diameter than the diameter of the valve element 57 so that the valve element will be free to move without contacting with the wall of the opening 74.

The wall of the housing 65 is formed with one or more openings 75. The openings 75 are in proximity to the flanged portion 73 of the nut 72 so that access may be had to the periphery of said nut for the purpose of adjusting the nut.

Pivotally mounted as at 76, to the rotator 66, is a pair of diametrically disposed members 77 constituting the fly-balls of governing mechanism for operating the valve element 57.

The members 77 each comprise an L-shaped structure, one leg 78 of which projects outwardly from the pivot 76 and the other leg 79 of which projects inwardly from the pivot 76 towards the shank of the valve element 57.

Mounted on the portion of the shank of the valve element 57 adjacent the reduced end portion 70 is a ball bearing device 80 comprising inner and outer shells and an annular series of balls mounted between the shells.

The extremities of the legs 78 are adapted to engage the outer shell of the ball bearing 80 in the manner shown in Fig. 4.

The ball bearing 80 is retained from relative movement with respect to the valve element 57, being confined between flanges or shoulders 81 and 82.

Encircling the portion of the valve element 57 between the nut 72 and the bearing 80 is an expansible coil spring 83 which normally urges the valve element 57 in the direction of the arrow, Fig. 4, so that the members 77 and the valve element 57 are urged towards their respective positions shown in Fig. 2.

Coupled to the outer end of the shaft 67 is one end of a flexible drive shaft 84. The other end of the drive shaft 84 is operatively connected, as at 85 to the shaft 21 of the pump 14. The construction is such that when the pump 14 is in operation the flexible drive shaft 84 will be operated and therefore effect rotation of the rotator 66 and the parts carried thereby at a predetermined speed in accordance with the speed of rotation of the pump 14.

In operation, assuming that the pump 14 is idle, the plug 16 of the valve 13 will be in closed position, as shown in Fig. 1 and the control valve 19, the pilot valve 20 and their associated parts will be in the relative positions shown in Fig. 2.

When the pump 14 is first started it is rotated slowly but with gradually increasing speed. After the pump is primed it reaches a speed which rotates the rotator 66 at a sufficient number of revolutions per minute so that the centrifugal force causes the members 77 to swing on their pivots 76 from the position shown in Fig. 2 to the position shown in Fig. 4. The legs 79 of the members 77 acting on the underside of the bearing 80 force the valve element 57 outwardly so that head 58 uncovers port 62 and head 59 laps port 63.

Fluid under pressure will then be admitted to chamber 60 from pipe and port 62 and will flow from chamber 60 through port or passage 61 to chamber 36 thereby acting against the end of the piston provided by head 28.

Since the area of the head 28 is greater than the area of head 25, even when the pressure of the fluid thus admitted to chamber 36 no more than equals the pressure of the fluid in chamber 32 the plunger 24 will be shifted from its position shown in Figs. 2 and 5, towards the left to the position shown in Fig. 4. In this way heads 26 and 27 will be moved so that port 44 is cut off from the sewer and connected to the fluid pressure chamber 34, and port 43 is cut off from the fluid pressure chamber and connected to the sewer through port 40, passage 41 and pipe 42.

In this way fluid under pressure will be supplied through port 44 and passage 53 to the underside of the valve operating piston in cylinder 18 and the valve 13 operated in the manner fully described in the above referred to Brisbane and Myers valve application to open the plug 15 and thereby establish communication from pipe 11 to pipe 12.

In this manner the valve 13 will be opened when the pump 14 has come up to speed and is prepared to deliver the fluid pumped, and said valve will remain open during the operation of the pump.

However, if for any reason the pump 14 stops the valve 13 will be automatically closed. When the pump slows down to below its normal operating speed, the members 77 will return instantly to their original position (see Fig. 2) due to the pressure exerted by spring 83 acting on the valve element 57. Said valve element 57 will thus be moved to the position in which head 58 laps port 62 and in which port 63 is uncovered.

When port 62 is lapped by head 58 the supply of fluid under pressure to valve chamber 36 will be cut off, and fluid under pressure in chamber 36 will pass to the sewer through port 61, chamber 60, and port and pipe 63.

Since fluid under pressure is always supplied to valve chamber 32 in the manner heretofore described, the pressure of the fluid in chamber 32 acting on the piston head 25 will move the plunger 24 towards the right thereby returning the plunger to the position shown in Figs. 2 and 5. In this way fluid passage 53 will be connected to the sewer through port 44, chamber 33, port 39, passage 41 and pipe 42. At the same time fluid passage 52 will be connected to the source of supply of fluid under pressure, through port 43, chamber 34, port and passage 37, and pipe 38. The valve operating mechanism will thus be operated to turn the valve plug 15 to closed position, thereby cutting off communication between pipes 11 and 12.

In order to effect operation of the device in the manner above described the tension of the spring 83 is so set by adjusting the nut 72 that when the rotator 66 is operated by the pump 14, a predetermined speed of rotation must be first attained before the members 77 are actuated. When the rotator 66 has attained its predetermined speed, the members 77 are adapted to instantly assume their maximum outboard position (see Fig. 4) so that the valve element 57 will be quickly shifted from one position to the other position without any lag. The purpose of operating the device in this manner is to prevent any intermediate positions being assumed by the parts, such as occur in the use of governors or actuating mechanisms which use a stable spring.

Having thus described our invention, what we claim is:

1. Fluid control means comprising a main pipe line, a main valve for controlling the flow of fluid through said pipe line, a supply pump connected to said pipe line at one side of the main valve, fluid-pressure operating means for the main valve connected to the pipe line at the opposite side of the main valve, a reciprocatory control valve for said operating means adapted to be initially operated in one direction by the pressure through said connection to cause the main valve to be closed, a pressure connection from the pipe line at the pump side of the main valve to operate the control valve in the opposite direction against the first-mentioned operating pressure to cause the main valve to be opened, a pilot valve for controlling operation of said control valve by the pressure through said second connection, and a centrifugal governor mechanically connected to and operated by said pump for opening said pilot valve to cause the opening of the main valve only after the pump has attained sufficient speed to provide normal supply pressure for the pipe line, and the main valve also remaining unopened if the pump fails for any other reason to provide pressure for operating the control valve.

2. A fluid pressure control device comprising a valve casing with end closures, an endwise reciprocating valve member with end piston members of differing size slidably fitted in corresponding end portions of the interior of the valve casing, said valve member having side ports in its intermediate portion, pressure supply and exhaust ports and pressure distributing ports in the intermediate portion of the valve casing cooperating with said ports in the valve, a passage through said valve member from the end of its smaller piston member to a side port that cooperates with said pressure supply port, a pilot valve slidable in an opening in the casing end closure that is adjacent the larger valve piston member, a port leading from said opening into the main casing opposite said piston member, an independent pressure supply port and an exhaust port for the pilot valve adapted to be alternately connected thereby to said main casing port, said pilot valve extending outside of said last-mentioned end closure for engagement with operating means therefor.

3. A fluid pressure control device comprising a valve casing with end closures, a piston valve having multiple heads fitted in said casing for free reciprocation and having annular ports between the heads, one end head being smaller than the remaining heads, pressure supply and exhaust ports and passages in said casing, pressure-distributing ports and passages in said casing adapted to be connected alternately to pressure and exhaust by said valve in its movements, a passage through said piston valve from its smaller end to an annular port communicating with the said pressure supply, a pilot valve slidable in an opening in the casing end closure that is adjacent the large end of the piston valve, a port leading from said opening into the main casing opposite said valve end, an independent pressure supply port and an exhaust port for the pilot valve adapted to be alternately connected thereby to said main casing port, said pilot valve extending outside of said last-mentioned end closure, and means cooperating with such extension for operating the pilot valve.

4. A fluid pressure control device comprising a valve casing with end closures, a piston valve having multiple heads fitted in said casing for free reciprocation and having annular ports between the heads, a single supply port at one end of the valve casing through which fluid pressure is supplied to and exhausted therefrom, a pilot valve for controlling communication to said single supply port, means for operating said pilot valve, said pilot valve having a pair of spaced heads, a pair of ports associated with the spaced heads of the pilot valve, said pair of ports being spaced apart with relation to said spaced heads so that when one head laps one port the other head uncovers the other port, a chamber connected to said single supply port and adapted to be connected to either one of said supply ports by the space between the pilot valve heads, means for supplying fluid under pressure to one pilot valve port, and means for connecting the other pilot valve port to a sewer.

5. In a fluid control means, the combination with a valve casing formed with end closures, a piston valve having multiple heads fitted in said casing for free reciprocation and having annular ports between the heads, pressure supply and exhaust ports and passages in said casing, pressure-distributing ports and passages in said casing adapted to be connected alternately to pressure and exhaust by said valve in its movements, a passage through said piston valve from its smaller end to an annular port communicating with said pressure supply, of a pilot valve slidable in an opening in the casing end closure that is adjacent the larger end of the piston valve, a single supply port through which fluid pressure is supplied to and exhausted from the chamber at the larger end of the piston valve, means for operating said pilot valve, said pilot valve having a pair of spaced heads, a pair of ports associated with the spaced heads of the pilot valve, said pair of ports being spaced apart with relation to said spaced heads so that when one head laps one port the other head uncovers the other port, a chamber connected to said single supply port and adapted to be alternately connected to either of said spaced ports by the space between the pilot valve heads, means for supplying fluid under pressure to one pilot valve port, and means for connecting the other pilot valve port to a sewer.

EUGENE C. BRISBANE.
FRANK E. PEACOCK.